US008442317B2

(12) United States Patent
Muninder et al.

(10) Patent No.: US 8,442,317 B2
(45) Date of Patent: May 14, 2013

(54) METHOD, APPARATUS AND COMPUTER PROGRAM PRODUCT FOR COMPENSATING EYE COLOR DEFECTS

(75) Inventors: Veldandi Muninder, Bangalore (IN); Pranav Mishra, Bangalore (IN); Krishna Annasagar Govindarao, Bangalore (IN); Basavaraj S V, Bangalore (IN)

(73) Assignee: Nokia Corporation, Espoo (FI)

( * ) Notice: Subject to any disclaimer, the term of this patent is extended or adjusted under 35 U.S.C. 154(b) by 114 days.

(21) Appl. No.: 13/099,131

(22) Filed: May 2, 2011

(65) Prior Publication Data

US 2011/0268354 A1    Nov. 3, 2011

(30) Foreign Application Priority Data

Apr. 30, 2010    (IN) .......................... 1208/CHE/2010

(51) Int. Cl.
*G06K 9/00* (2006.01)
(52) U.S. Cl.
USPC ........................................................ 382/167
(58) Field of Classification Search .................. 382/115, 382/117, 165, 167, 275; 348/223.1, 224.1, 348/225.1
See application file for complete search history.

(56) References Cited

U.S. PATENT DOCUMENTS

| 7,403,654 | B2 * | 7/2008 | Wu et al. ........................ 382/167 |
| 2004/0213476 | A1 | 10/2004 | Luo et al. |
| 2005/0232481 | A1 * | 10/2005 | Wu .............................. 382/167 |
| 2006/0008169 | A1 | 1/2006 | Deer et al. |
| 2006/0280362 | A1 | 12/2006 | Umeda |

FOREIGN PATENT DOCUMENTS

WO        0171421 A1        9/2001

OTHER PUBLICATIONS

International Search Report and Written Opinion received for corresponding Patent Cooperation Treaty Application No. PCT/FI2011/050229, dated Jul. 11, 2011, 14 pages.

* cited by examiner

*Primary Examiner* — Duy M Dang
(74) *Attorney, Agent, or Firm* — Nokia Corporation

(57) ABSTRACT

Method, apparatus, and computer program product are provided. The method includes computing a first difference image for a first eye region based on a difference of red pixel intensity and green pixel intensity of each of a first set of pixels associated with the first eye region. The method further includes determining a first eye color defect region by computing a neighborhood processed first difference image by processing the first difference image, computing a first central point of the neighborhood processed first difference image based on a weighted centroid of red pixels associated with the neighborhood processed first difference image, and thereafter computing the first eye color defect region based on the first central point, and the red pixels associated with the first difference image.

15 Claims, 7 Drawing Sheets

METHOD, APPARATUS AND COMPUTER PROGRAM PRODUCT FOR COMPENSATING EYE COLOR DEFECTS

CROSS REFERENCE TO RELATED APPLICATIONS

The subject application claims priority benefit to Indian Patent Application No. 1208/CHE/2010, filed Apr. 30, 2010 and is hereby incorporated by reference.

TECHNICAL FIELD

Various implementations generally relate to image processing, and more particularly, to methods, apparatus and computer program products for compensating eye color defects.

BACKGROUND

Eye color defect phenomenon (for example red eyes) is usually observed in images captured in low ambient illumination conditions. Typically, in low ambient illumination conditions, the pupils of eyes of the subject are wide open, and when the flash light hits the eye, an internal reflection from vascular membrane behind the retina of the subject's eyes occurs. In humans, such internal reflections often result in unnatural reddening of the pupil region of the eyes thereof. However, in other types of animals, other colors may result, such as golden eyes and the like.

Apart from low ambient illumination levels, various other factors also contribute to the occurrence of the red eyes. Such factors may include small angle between the flash of the image capturing device and the lens thereof, proximity of the candidate to the image capturing device, and the like.

Typically, in order to avoid appearance of the red eyes in the images, image capturing devices are utilized that may include a secondary lamp or light that is flashed prior to capturing the image. This lamp exposes the subject's eyes to light for few seconds before exposure to the actual flash light, thereby giving pupils enough time to contract. In some instances, instead of one full flash, the image capturing device provides multiple pre-flashes that may produce the same effect as being produced by single flash of the secondary lamp. However, such devices may introduce a time delay between the first flash and actual capturing of the image, due to which the subject may deviate from a posed position before the actual image is captured.

Further, user intervention may be required in correcting the red eye problem in the images by processing the clicked image to remove the color defects from the eyes. However, such user intervention in identifying and removing red-eyes may prove cumbersome and inefficient. Furthermore, due to user intervention, the red eyes may be misinterpreted as non-red eye regions, and vice-versa. Moreover, such devices may often miss out on other known eye color defects such as golden eyes, and the like. Accordingly, the currently available techniques provide little use in detecting eye color defects of varying saturation and brightness.

SUMMARY OF VARIOUS EMBODIMENTS

Methods, computer program products, and apparatus for compensating eye color defects are provided.

In one aspect, a method is provided. The method includes computing a first difference image for a first eye region. The first difference image may be computed based on a difference of red pixel intensity and green pixel intensity of each of a first set of pixels associated with the first eye region. The method further includes determining a first eye color defect region by computing a neighborhood processed first difference image by processing the first difference image. Thereafter, a first central point of the neighborhood processed first difference image may be computed based on a weighted centroid of red pixels associated with the neighborhood processed first difference image. The first eye color defect region may be computed based on the first central point, and the red pixels associated with the first difference image.

In an embodiment, computing the neighborhood processed first difference image includes dividing the first difference image into a plurality of regions such that each of the plurality of regions may have an average intensity. The average intensity of a region of the plurality of regions may be compared with the average intensity of a predetermined number of neighboring regions of the region, and a null value may be assigned to the region of the plurality of regions, if the average intensity of at least a first predetermined threshold number of neighboring regions is less than a first predetermined fraction of the average intensity of the region. The intensity of each region of the neighborhood processed first difference image includes one of the null value and values corresponding to the first difference image.

In an embodiment, the weighted centroid of the red pixels is computed based on co-ordinates of the red pixels associated with the neighborhood processed first difference image, at least one of a first threshold intensity and a second threshold intensity. The first threshold intensity and the second threshold intensity may be a minimum value and a maximum value respectively of a percentile of cumulative distribution function of the first normalized difference image.

In an embodiment, one or more verifications of the presence of an eye color defect at the first eye color defect region may be performed upon determining the first eye color defect region. Further, a second difference image may be computed based on the one or more verifications. The second difference image may be computed based on a difference of red pixel intensity and green pixel intensity of a second set of pixels and an intensity level of the second set of pixels. The second set of pixels may be associated with a second eye region. Further, a neighborhood processed second difference image may be computed by processing the second difference image. Also, a second central point of the neighborhood processed second difference image may be computed based on a weighted centroid of red pixels associated with the neighborhood processed second difference image. The first eye color defect region may also be computed based on the second central point, and the red pixels associated with the first difference image. Thereafter, one or more verifications may be performed for verifying the presence of the eye color defect at the computed second eye color defect region.

In an embodiment, the one or more verifications includes computing a smallest bounding rectangle for enclosing the first eye color defect region, and dividing a neighborhood region of the smallest bounding rectangle into a plurality of regions. Each of the plurality of regions may have an average pixel intensity. Thereafter, an average pixel intensity of the enclosed first eye color defect region, and a number of neighborhood regions having average pixel intensity lesser than a second predetermined fraction of the average pixel intensity of the enclosed first eye color defect region may be computed. Further, presence of the eye color defect at the computed first eye color defect region may be determined upon determining the number of neighborhood regions having an average pixel intensity less than a second predetermined fraction of the average pixel intensity of the enclosed first eye color defect region being greater than a second predetermined threshold.

In an embodiment, the first eye color defect region may be re-computed upon determining the number of neighborhood regions having the average pixel intensity greater than the second predetermined fraction of average pixel intensity of the enclosed first eye color defect region. Further, verification may be performed based on a shape of the first eye color defect region upon verifying presence of the eye color defect at the computed first eye color defect region.

In an embodiment, prior to computing the second difference image, an absence of the eye color defect at the computed first eye color defect region may be determined based on the one or more verifications. Accordingly, the determined first eye color defect region may be nullified. Moreover, the first eye color region may be re-determined, and the thereafter verified for the presence of the eye color defect.

Upon verification, if an absence of the eye color defect is determined at the re-determined first eye color defect region, then a second difference image may be computed based on a difference of red pixel intensity and green pixel intensity of a second set of pixels and an intensity level of the second set of pixels. The second set of pixels may be associated with a second eye region. Further, a neighborhood processed second difference image may be computed by processing the second difference image. Also, a second central point of the neighborhood processed second difference image may be computed based on a weighted centroid of red pixels associated with the neighborhood processed second difference image. The first eye color defect region may also be computed based on the second central point, and the red pixels associated with the first difference image. Thereafter, one or more verifications may be of the presence of the eye color defect at the computed second eye color defect region may be performed.

In an embodiment, the one or more verifications includes performing a verification based on a shape of the first eye color defect region upon verifying presence of the eye color defect at the computed first eye color defect region. In an embodiment, the eye color defect at the re-determined first eye color defect region may be corrected.

In another aspect, an apparatus is provided. The apparatus includes at least one processor, and at least one memory comprising computer program code. The at least one memory and the computer program code configured to, with the at least one processor, cause the apparatus at least to compute a first difference image for a first eye region. The first difference image may be computed based on a difference of red pixel intensity and green pixel intensity of each of a first set of pixels associated with the first eye region. Further, the at least one memory and the computer program code configured to, with the at least one processor, cause the apparatus at least to determine a first eye color defect region by computing a neighborhood processed first difference image by processing the first difference image. Thereafter, a first central point of the neighborhood processed first difference image may be computed based on a weighted centroid of red pixels associated with the neighborhood processed first difference image. The first eye color defect region may be computed based on the first central point, and the red pixels associated with the first difference image.

In an embodiment, the at least one memory and the computer program code configured to, with the at least one processor, cause the apparatus to compute the neighborhood processed first difference image by dividing the first difference image into a plurality of regions such that each of the plurality of regions may have an average intensity. Further, the at least one memory and the computer program code configured to, with the at least one processor, cause the apparatus to compare the average intensity of a region of the plurality of regions with the average intensity of a predetermined number of neighboring regions of the region, and assign a null value to the region of the plurality of regions, if the average intensity of at least a first predetermined threshold number of neighboring regions is less than a first predetermined fraction of the average intensity of the region. The intensity of each region of the neighborhood processed first difference image may include one of the null value and values corresponding to the first difference image.

In an embodiment, the at least one memory and the computer program code configured to, with the at least one processor, cause the apparatus at least to compute the weighted centroid of the red pixels based on co-ordinates of the red pixels associated with the neighborhood processed first difference image, at least one of a first threshold intensity and a second threshold intensity. The first threshold intensity and the second threshold intensity may be a minimum value and a maximum value respectively of a percentile of cumulative distribution function of the first normalized difference image.

In an embodiment, the at least one memory and the computer program code configured to, with the at least one processor, cause the apparatus at least to perform one or more verifications of the presence of an eye color defect at the first eye color defect region upon determining the first eye color defect region. Further, the at least one memory and the computer program code configured to, with the at least one processor, cause the apparatus at least to compute a second difference image based on the one or more verifications. The second difference image may be computed based on a difference of red pixel intensity and green pixel intensity of a second set of pixels and an intensity level of the second set of pixels. The second set of pixels may be associated with a second eye region. Further, the at least one memory and the computer program code configured to, with the at least one processor, cause the apparatus at least to determine a second eye color defect region by computing a neighborhood processed second difference image. Also, the at least one memory and the computer program code configured to, with the at least one processor, cause the apparatus at least to compute a second central point of the neighborhood processed second difference image based on a weighted centroid of red pixels associated with the neighborhood processed second difference image. The second eye color defect region may also be computed based on the second central point, and the red pixels associated with the first difference image. Thereafter, the at least one memory and the computer program code configured to, with the at least one processor, cause the apparatus at least to perform one or more verifications of the presence of the eye color defect at the computed second eye color defect region.

In an embodiment, the at least one memory and the computer program code configured to, with the at least one processor, cause the apparatus at least to perform the one or more verifications by computing a smallest bounding rectangle for enclosing the first eye color defect region, and dividing a neighborhood region of the smallest bounding rectangle into a plurality of regions. Each of the plurality of regions may have an average pixel intensity. Thereafter, an average pixel intensity of the enclosed first eye color defect region, and a number of neighborhood regions having average pixel intensity lesser than a second predetermined fraction of the average pixel intensity of the enclosed first eye color defect region may be computed. Further, the at least one memory and the computer program code configured to, with the at least one processor, cause the apparatus at least to determine presence of the eye color defect at the computed first eye color defect region upon determining the number of neighborhood regions having an average pixel intensity less than a second predetermined fraction of the average pixel intensity of the enclosed first eye color defect region being greater than a second predetermined threshold.

In an embodiment, the at least one memory and the computer program code configured to, with the at least one processor, cause the apparatus at least to re-compute the first eye color defect region upon determining the number of neighborhood regions having the average pixel intensity greater than the second predetermined fraction of average pixel intensity of the enclosed first eye color defect region. Further, verification may be performed based on a shape of the first eye color defect region upon verifying presence of the eye color defect at the computed first eye color defect region.

In an embodiment, prior to computing the second difference image, the at least one memory and the computer program code configured to, with the at least one processor, cause the apparatus at least to determine an absence of the eye color defect at the computed first eye color defect region based on the one or more verifications. Accordingly, the determined first eye color defect region may be nullified. Moreover, the first eye color region may be re-determined, and the thereafter verified for the presence of the eye color defect.

Upon verification, if an absence of the eye color defect is determined at the re-determined first eye color defect region, then the second difference image may be computed based on a difference of red pixel intensity and green pixel intensity of a second set of pixels and an intensity level of the second set of pixels. The second set of pixels may be associated with a second eye region. Further, a neighborhood processed second difference image may be computed by processing the second difference image. Also, a second central point of the neighborhood processed second difference image may be computed based on a weighted centroid of red pixels associated with the neighborhood processed second difference image. The first eye color defect region may also be computed based on the second central point, and the red pixels associated with the first difference image. Thereafter, one or more verifications may be performed for verifying the presence of the eye color defect at the computed second eye color defect region may be performed.

In an embodiment, the at least one memory and the computer program code configured to, with the at least one processor, cause the apparatus at least to perform a verification based on a shape of the first eye color defect region upon verifying presence of the eye color defect at the computed first eye color defect region. In an embodiment, the at least one memory and the computer program code configured to, with the at least one processor, cause the apparatus at least to correct the eye color defect at the re-determined first eye color defect region.

In yet another aspect, a computer program product is provided. The computer program product includes at least one computer-readable storage medium, the computer-readable storage medium includes a set of instructions configured to compute a first difference image for a first eye region. The first difference image may be computed based on a difference of red pixel intensity and green pixel intensity of each of a first set of pixels associated with the first eye region. Further, the computer-readable storage medium includes a set of instructions configured to determine a first eye color defect region by computing a neighborhood processed first difference image by processing the first difference image. Thereafter, a first central point of the neighborhood processed first difference image may be computed based on a weighted centroid of red pixels associated with the neighborhood processed first difference image. The first eye color defect region may be computed based on the first central point, and the red pixels associated with the first difference image.

In an embodiment, the computer-readable storage medium includes a set of instructions configured to compute the neighborhood processed first difference image by dividing the first difference image into a plurality of regions such that each of the plurality of regions may have an average intensity. Further, the computer-readable storage medium includes a set of instructions configured to compare the average intensity of a region of the plurality of regions with the average intensity of a predetermined number of neighboring regions of the region, and assign a null value to the region of the plurality of regions, if the average intensity of at least a first predetermined threshold number of neighboring regions is less than a first predetermined fraction of the average intensity of the region. The intensity of each region of the neighborhood processed first difference image may include one of the null value and values corresponding to the first difference image.

In an embodiment, the computer-readable storage medium includes a set of instructions configured to compute the weighted centroid of the red pixels based on co-ordinates of the red pixels associated with the neighborhood processed first difference image, a first threshold intensity and a second threshold intensity. The first threshold intensity and the second threshold intensity may be a minimum value and a maximum value respectively of a percentile of cumulative distribution function of the first normalized difference image.

In an embodiment, the computer-readable storage medium includes a set of instructions configured to perform one or more verifications of the presence of an eye color defect at the first eye color defect region upon determining the first eye color defect region. Further, the computer-readable storage medium includes a set of instructions configured to compute a second difference image based on the one or more verifications. The second difference image may be computed based on a difference of red pixel intensity and green pixel intensity of a second set of pixels and an intensity level of the second set of pixels. The second set of pixels may be associated with a second eye region. Further, the computer-readable storage medium includes a set of instructions configured to compute a neighborhood processed second difference image by determining a second eye color defect region. The second eye color defect region may be determined by computing a neighborhood processed second difference image processing the second difference image. Also, the computer-readable storage medium includes a set of instructions configured to compute a second central point of the neighborhood processed second difference image based on a weighted centroid of red pixels associated with the neighborhood processed second difference image. The second eye color defect region may also be computed based on the second central point, and the red pixels associated with the first difference image. Thereafter, the computer-readable storage medium includes a set of instructions configured to perform one or more verifications of the presence of the eye color defect at the computed second eye color defect region.

In an embodiment, the computer-readable storage medium includes a set of instructions configured to perform the one or more verifications by computing a smallest bounding rectangle for enclosing the first eye color defect region, and dividing a neighborhood region of the smallest bounding rectangle into a plurality of regions. Each of the plurality of regions may have average pixel intensity. Thereafter, an average pixel intensity of the enclosed first eye color defect region, and a number of neighborhood regions having average pixel intensity lesser than a second predetermined fraction of the average pixel intensity of the enclosed first eye color defect region may be computed. Further, the computer-readable storage medium includes a set of instructions configured to determine presence of the eye color defect at the computed first eye color defect region upon determining the number of neighborhood regions having an average pixel intensity less than a second predetermined fraction of the average pixel intensity of the enclosed first eye color defect region being greater than a second predetermined threshold.

In an embodiment, the computer-readable storage medium includes a set of instructions configured to re-compute the first eye color defect region upon determining the number of neighborhood regions having the average pixel intensity greater than the second predetermined fraction of average pixel intensity of the enclosed first eye color defect region. Further, verification may be performed based on a shape of the first eye color defect region upon verifying presence of the eye color defect at the computed first eye color defect region.

In an embodiment, prior to computing the second difference image, the computer-readable storage medium includes a set of instructions configured to determine an absence of eye color defect region based on the one or more verifications. Accordingly, the determined first eye color defect region may be nullified. Moreover, the first eye color region may be re-determined, and the thereafter verified for the presence of the eye color defect. Upon verification, if an absence of the eye color defect is determined at the re-determined first eye color defect region, then, a second difference image may be computed based on a difference of red pixel intensity and green pixel intensity of a second set of pixels and an intensity level of the second set of pixels. The second set of pixels may be associated with a second eye region. Further, a neighborhood processed second difference image may be computed by processing the second difference image. Also, a second central point of the neighborhood processed second difference image may be computed based on a weighted centroid of red pixels associated with the neighborhood processed second difference image. The first eye color defect region may also be computed based on the second central point, and the red pixels associated with the first difference image. Thereafter, one or more verifications may be performed for verifying the presence of the eye color defect at the computed second eye color defect region.

In an embodiment, the computer-readable storage medium includes a set of instructions configured to perform a verification based on a shape of the first eye color defect region upon verifying presence of the eye color defect at the computed first eye color defect region. In an embodiment, the computer-readable storage medium includes a set of instructions configured to correct the eye color defect at the re-determined first eye color defect region.

In still another aspect, a method is provided. The method includes computing a first difference image for a first eye region. The first difference image may be computed based on a difference of red pixel intensity and green pixels intensity of each of the first set of pixels associated with the first eye region. The method also includes computing a neighborhood processed first difference image by processing the first difference image. Further, the method includes computing a first central point of the neighborhood processed first difference image based on a weighted centroid of red pixels associated with the neighborhood processed first difference image.

In an embodiment, the method includes computing the weighted centroid of the red pixels based on co-ordinates of the red pixels associated with the neighborhood processed first difference image, a first threshold intensity and a second threshold intensity. The first threshold intensity and the second threshold intensity may be a minimum value and a maximum value respectively of a percentile of cumulative distribution function of the first difference image. In an embodiment, the first central point may be computed in accordance with the following equations:

$$Xc = \Sigma\{j*x(i,j)^K\}/\Sigma x(i,j)^K,$$

$$Yc = \Sigma\{i*x(i,j)^K\}/\Sigma x(i,j)^K$$

where (i,j) are coordinates of the neighborhood processed first difference image, k is a constant, and intensity at x(i,j) is equal to intensity at a corresponding region of the neighborhood processed first difference image when intensity at the neighborhood processed first difference image is greater than or equal to the first threshold intensity.

In still another aspect, a method is provided. The method includes computing a smallest bounding rectangle for enclosing a first eye color defect region, and thereafter dividing a neighborhood region of the smallest bounding rectangle into a plurality of regions. Each of the plurality of regions may have an average pixel intensity. The method further includes computing an average pixel intensity of the enclosed first eye color defect region, and a number of neighborhood regions having average pixel intensity lesser than a second predetermined fraction of the average pixel intensity of the enclosed first eye color defect region. Further, the method include determining presence of an eye color defect at the enclosed first eye color defect region upon determining the number of neighborhood regions having an average pixel intensity less than a second predetermined fraction of the average pixel intensity of the enclosed first eye color defect region being greater than a second predetermined threshold.

In still another aspect, an apparatus is provided. The apparatus includes means for computing a first difference image for a first eye region. The first difference image may be computed based on a difference of red pixel intensity and green pixel intensity of each of a first set of pixels associated with the first eye region. Further, the apparatus includes means for determining a first eye color defect region by computing a neighborhood processed first difference image by processing the first difference image. Furthermore, the said means may be configured to compute a first central point of the neighborhood processed first difference image based on a weighted centroid of red pixels associated with the neighborhood processed first difference image. Moreover, said means may be configured to compute the first eye color defect region based on the first central point, and the red pixels associated with the first difference image.

BRIEF DESCRIPTION OF THE DRAWINGS

The above-mentioned and other features and effects of this present disclosure, and the manner of attaining them, will become more apparent and the present disclosure will be better understood by reference to the following description of embodiments of the present disclosure taken in conjunction with the accompanying drawings, wherein.

DETAILED DESCRIPTION

Methods, apparatus and computer program products are provided for compensating eye color defects in digital images. The methods, apparatus and computer program products facilitate detection of multiple eye color defects of different brightness and saturation that may include red eyes, golden eyes and the like, and thereafter verification of the detected multiple eye color defects.

As described herein, an image capturing device may be utilized for capturing an image of a subject such as a human being, an animal or any other object. Apart from capturing images, the image capturing device may be capable of storing the captured images, and transferring them to a printing or another storing medium. Examples of the image capturing device may include, but are not limited to, a film camera, a digital camera, a video camera, a camera in a mobile phone and the like. Hereinafter, the terms 'image capturing device' and 'camera' may be used interchangeably throughout the description for the sake of simplicity.

The camera may capture an image using a flash configured thereon that may potentially cause eye color defects in the captured image of the subject. The eye color defects may cause the color of eyes in the captured image to appear in one of the colors, for example, as red color, golden color, orange color, and the like instead of black color. As disclosed herein, the images captured by the camera may be analyzed for eye color defects, and the regions with such eye color defects may be detected. The eye color defect detection may be performed by a camera or, alternatively the captured images may be transferred to a computing device that is capable of detecting eye color defects. Such methods, apparatus and computer program products are described in detail in conjunction with FIGS. 1 through 7.

Figure 1:
FIG. 1 is a schematic diagram of a digital image illustrating an eye color defect.

Referring now to FIG. 1, an image 100 depicting a human face 102 is illustrated. The face 102 is shown to include eyes such as an eye 104. Each of the eyes includes a pupil, an iris and sclera. It may be assumed that the eyes of the human face 102 exhibits an eye color defect phenomenon, and accordingly the pupil 106 thereof may appear in one of the shades of red color, for example, deep red color, golden color, orange color, and the like. For the purpose of illustrating the eye color defect phenomenon in FIG. 1, the pupil 106 of the eye 104 is shown to assume a lighter color instead of black color. As is known to a person skilled in the art, the eye color defect is also known as red eye, accordingly, in the present description the terms 'red eye' and 'eye color defect' may be used interchangeably.

As disclosed herein, various embodiments provide methods for compensating eye color defects by performing computation based on a determination of a central point of the eye color defect region. Moreover, various embodiments disclosed herein facilitate detection of eye color defects of varying brightness and saturation by using an N-pass method. A first pass may be performed on a potential red eye region in the image. A correction for removal of the red eye may be performed, if the red eye is verified to be present at said region. However, if the red eye is not detected in the first pass or if a partial red eye is detected in the first pass, then one or more subsequent passes (such as a second pass) may be performed for detecting the red eye. Various implementations of methods of verification of presence of red eye at the detected red eye region are provided. Upon verification, the detected red eyes may be removed from the image. Some implementations of these methods are explained in the description below by using flowcharts and schematic diagrams. Accordingly, FIGS. 2, 3, 4, and 5 may be referred simultaneously for the description of some of the methods for compensation of eye color defects in the digital images.

Figure 2:
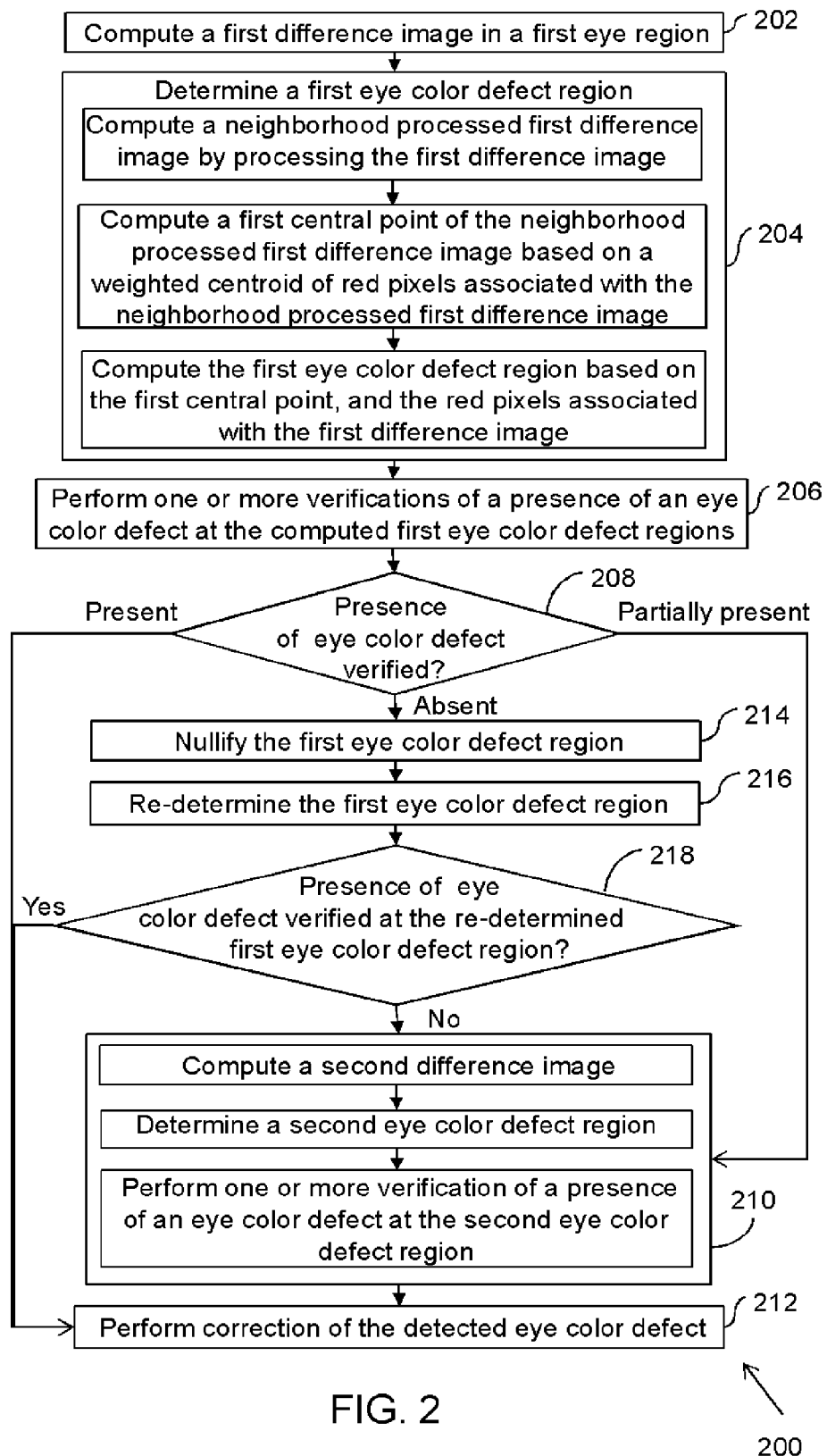
FIG. 2 is a flow chart of a method for compensating eye color defects, in accordance with an embodiment.

Referring now to FIG. 2, a flowchart for a method 200 for compensating eye color defects in digital images is illustrated. It may be understood that for describing the method 200, references herein may be made to FIG. 1. A digital image, such as the image 100 of a subject, such as a human face 102 may be captured using an image capturing device, for example, a camera. The digital image may exhibit an eye color defect phenomenon such as a red eye, as illustrated in FIG. 1.

As disclosed herein, for detecting eye color defects, such as red eyes, at least one eye region containing the eye and neighborhood region thereof may be determined by at least one processor. The at least one processor may be a central processing unit, a microprocessor or microcontroller, or programmable logic controller (PLC), or the like or combination thereof of an apparatus that may be utilized for the detection of the at least eye color defect one region in the digital image.

In an embodiment, the eye region may be detected by first detecting a location or region of the face 102 in the image 100, and thereafter determining approximate location of the eyes, such as the eye 104 within the detected region of the face 102. The region of the face (hereinafter referred to as face region) may be determined by any technique known in the art. For example, the face region may be determined by using pattern recognition face detection technique. The orientation of the face may also be obtained using patter recognition face detection technique. Upon determining approximate location of the face region, an approximate location of the eyes on the detected face region may be determined. In an embodiment, the approximate location of the eyes may be determined by using pattern recognition eye locator being executed inside the detected face region.

Upon determining approximate eye region, a neighborhood region of the eye is selected by the at least one processor. The eye along with a neighborhood region thereof may hereinafter be referred to as the eye region. The size of the eye region may approximately be selected as (face-width)/2* (face-height)/4 centered around each approximate eye region. The face-width and face-height are the dimensions of the face given by the pattern recognition face detection mechanism.

In an alternate embodiment, the eye region may be selected independent of the location of the eye, if the approximate location of the eyes is not available. In such a condition, a top left half portion and a top right half portion of the face region may be selected as eye regions for the case of a frontal face. However, for a non-frontal face, such as a profile face, a rotated face, and the like, appropriate eye regions may be selected based on the orientation of the respective face. For detecting eye color defects, the selected eye region herein may be referred to as a first eye region. The first eye region may enclose a first set of pixels.

The first set of pixels may be utilized for determining pixels corresponding to eye color defect region. In an embodiment, a first pass may be performed on each of the first set of pixels associated with the first eye region to determine pixels from the first set of pixels that are associated with one or more colors corresponding to eye color defects. The presence of the pixels of one or more colors are indicative of presence of an eye color defect at the selected at least one eye region. The one or more colors may be shades of red, golden, orange and such other colors. Hereinafter, the pixels associated with one or more colors corresponding to eye color defects may be referred to as red pixels.

Performing the first pass may include computing a first difference image $d1(x,y)$ in the first eye region at 202. The first difference image may indicate a presence of eye color defect at the selected eye region. The first difference image may be computed based on a difference of red pixels intensity and green pixel intensity of each of the first set of pixels associated with the first eye region. The computation of the first difference image $d1(x,y)$ may be represented by a mathematical expression as follows:

$$d1(x,y) = [r(x,y) - g(x,y)]^2 \text{ if } r(x,y) > g(x,y),$$

else $d1(x,y) = 0$
where $r(x,y)$ is the red pixel intensity at location $(x,y)$ in the image, and $g(x,y)$ denotes the green pixel intensity at the location $(x,y)$.

In an embodiment, the first difference image $d1(x,y)$ so computed may be normalized to assume values in a range of 0 to 255.

In an embodiment, a first threshold intensity and a second threshold intensity corresponding to a percentile of cumulative distribution function of the first difference image $d1(x,y)$ may be computed prior to processing the first difference image. The first threshold intensity (h_thr) and the second threshold intensity (l_thr) may be utilized for processing of the first difference image. In an embodiment, the value of said percentile for l_thr may be about 95% and for h_thr may be around 98%.

Utilizing the first difference image, a first eye color defect region at the first eye region may be determined at 204. A neighbourhood processed first difference image may be computed by processing the first difference image $d1(x,y)$. For the simplicity of the description, the first eye color defect region may be referred to as red eye region.

In an embodiment, the neighborhood processed first difference image may be computed by first copying the first difference image area $d1(x,y)$ into a temporary image $T(x,y)$, and thereafter dividing the temporary image $T(x,y)$ into a plurality of M×N non-overlapping regions. For example, a 200*200 first difference image $d1(x,y)$ may be copied into a temporary image $T(x,y)$, and the $T(x,y)$ may be divided into 20*20 non-overlapping regions. In an embodiment, the values of M and N may be 16 and 8, respectively. For each of the M×N regions of $T(x,y)$, an average value of intensity may be computed. The computation of average value of intensity for each of the M×N regions of $T(x,y)$ may be explained with reference to FIG. 3.

Upon computing the neighborhood processed first difference image, a first central point of the first eye color defect region may be computed based on a weighted centroid of the red pixels associated with the neighborhood processed first difference image. A first eye color defect region may also be computed based on the first central point and the red pixels associated with the first difference image. In an embodiment, the first eye color defect region may be computed by using a region growing technique. The computation of the first central point and the region growing method may be explained in FIG. 3.

Figure 4:
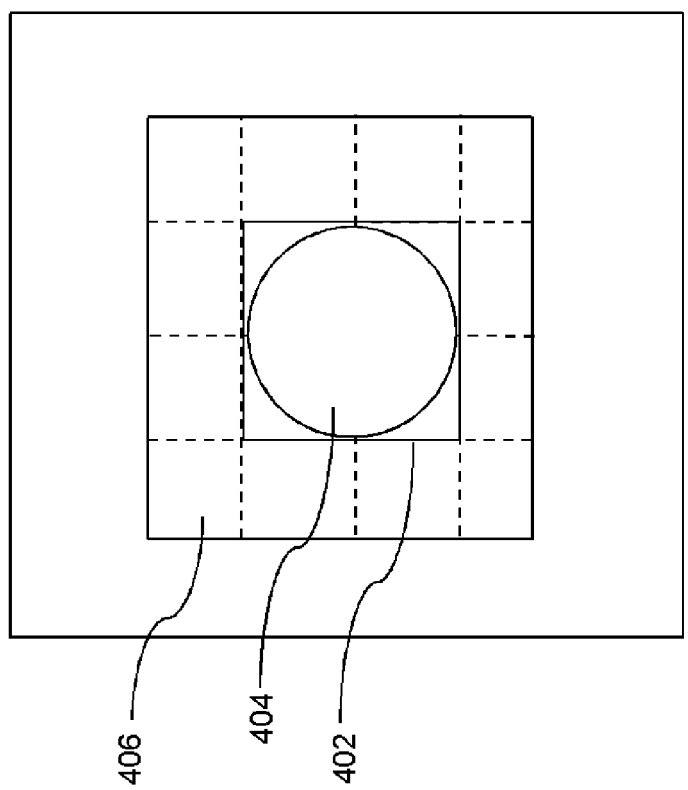
FIG. 4 is a schematic diagram illustrating verification of an eye color defect region in an image, in accordance with an embodiment.
Figure 5:
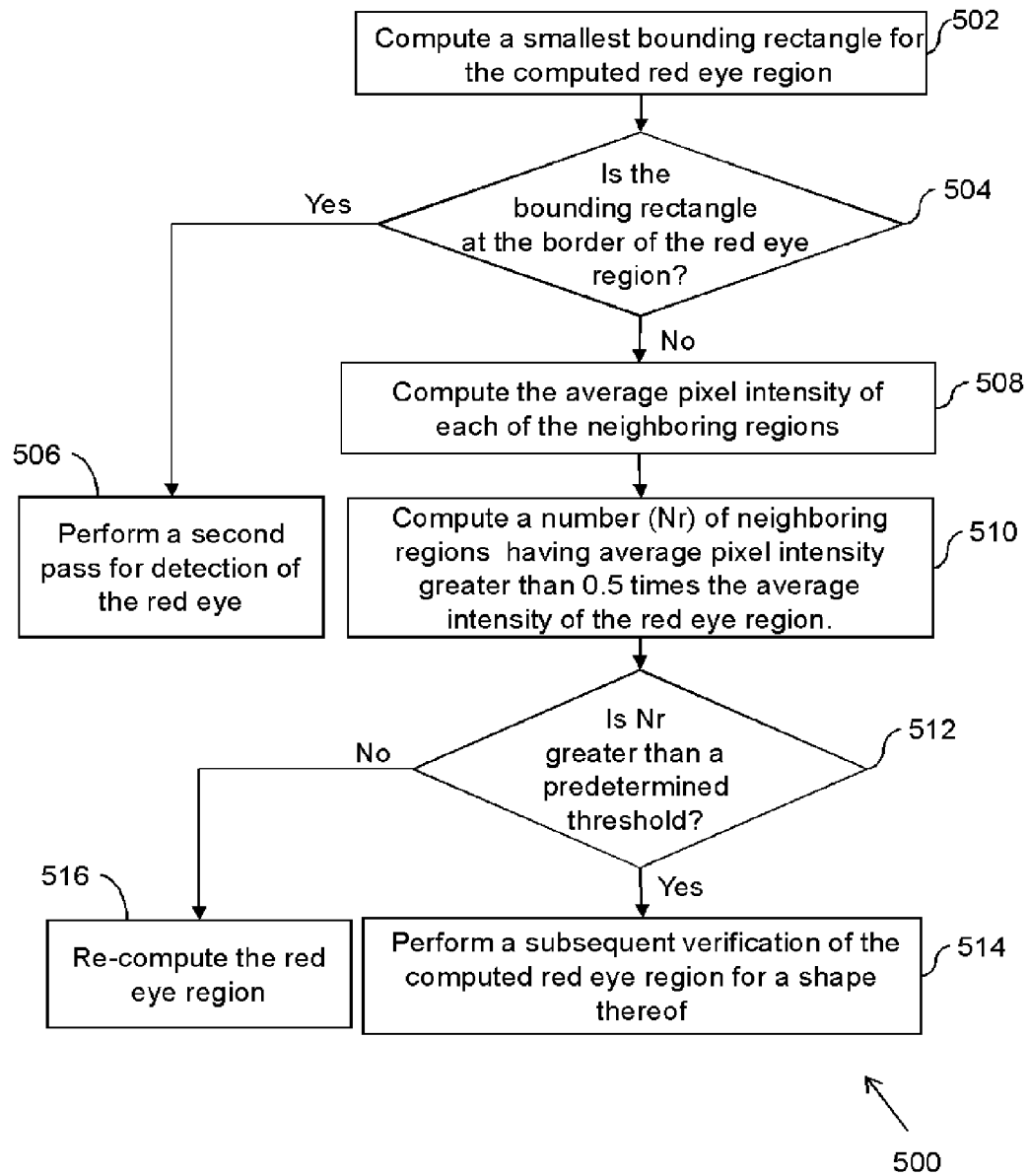
FIG. 5 is a flow chart of a method for verification of an eye color defect region in an image, in accordance with an embodiment.

The computed first eye color defect region may be verified for the presence of the red eye by performing one or more verifications at 206. The one or more verifications may be helpful in eliminating false detections of the red eyes in the images. The intensity of computed eye color defect region may be compared with the neighboring regions thereof. The detected eye color defect region may be a red eye, if there may be a sharp drop in intensity of pixels in moving from the eye towards any radially outward direction. In an embodiment, the verification may be performed by using a smallest bounding rectangle technique that is explained in conjunction with FIGS. 4 and 5. FIG. 4 is a schematic diagram illustrating verification of an eye color defect region using the smallest bounding rectangle technique, and FIG. 5 is a flow chart of a method 500 for verification of an eye color defect region using the smallest bounding rectangle technique.

At 208, presence of the eye color defect may be verified. If the computed red eye region is determined to be partially present (for example, at the border of the smallest bounding rectangle) at 208, a subsequent pass, such as the second pass may be performed at 210.

A subsequent pass, such as the second pass may be performed on a second set of pixels associated with a second eye region. The second eye region may be obtained by expanding boundaries of the first eye region, if during the first pass, the first eye region is determined to be located near the boundary of the smallest bounding rectangle. Accordingly, the region to be considered for red eye processing may be expanded in the second pass. In an embodiment, the region may be extended in that particular direction where the border in the first pass is absent.

In the second pass, a second difference image $d2(x,y)$ may be computed based on the difference of red pixel intensity and green pixel intensity in the second eye region, and an intensity level of the second set of pixels. Further, for calculating the second difference image $d2(x,y)$, a weighting function, $p(r(x,y))$, also known as precision function may be used. The precision function may be designed such that its value is small for low intensity pixels and is larger for high intensity pixels, thereby facilitating in reducing false detection in low intensity regions.

The second difference image may be computed as:

$$d2(x,y) = p(r(x,y)) * \{(r(x,y) - g(x,y))/r(x,y)\}^2 \text{ if } r(x,y) > g(x,y),$$

else $d2(x,y) = 0$ for the second eye region.

In an embodiment, the value of $p(i)$ for different intensities may vary as:
$p(i) = 0$; if $i < 40$;
$p(i) = 1$; if $(i >= 60)$;
$p(i) = (i - 40)/20$; if $(40 <= i < 60)$ Upon calculation of the second difference image $d2(x,y)$, a second eye color defect region may be computed. The computation of the second eye color defect region may include computation of a neighborhood processed second difference mage may be computed by processing the second difference image. The neighborhood processed second difference mage may be computed by copying the second difference image area $d2(x,y)$ into a temporary image, for example, $T(x,y)$, and the temporary image $T(x,y)$ may be divided into M×N non-overlapping regions. For each of the M×N regions of $T(x,y)$, an average value of intensity may be computed using an average image $A1(x,y)$. The computation of average for each of the M×N regions of $T(x,y)$ is explained with reference to FIG. 3.

By utilizing the co-ordinates of the processed neighborhood second difference image and the first threshold intensity, a second central point of the potential second red eye region may be computed as:

$$Xc2 = \Sigma\{j*x(i,j)^K\}/\Sigma x(i,j)^K$$

$$Yc2 = \Sigma\{i*x(i,j)^K\}/\Sigma x(i,j)^K$$

where (i,j) are coordinates of the region enclosed and the summation is over all i and j, and k is a constant; and where, $x(i,j)=d(x,y)$ if $d2(x,y)$ is greater than the first threshold intensity.

else $x(i,j)=0$.

The computation of the second central point of the red eye region using the above expression is based on the fact that the pixel intensity of the red pixels is greatest at the center of the red eye. Accordingly, the computed center of the red eye region of the eye may be represented by $P2\_1=\{Xc2, Yc2\}$.

Upon determining the second central point P2_1 of the red eye, the red eye region may be generated based on a region growing technique. Those pixels of the first difference image $d1(x,y)$ may be considered for region growing technique that may have red pixel intensity greater than the second threshold value of the intensity (I_thr). Such pixels may be connected to the center (Xc2,Yc2) of the red eye region based on eight neighborhood connectivity to generate a connected region red eye region. The connected region may be considered as the 'instance' of the red eye region, and may be verified for the characteristics of the red eye.

As described herein, the one or more verifications of the presence of a red eye may be performed on the computed second red eye region. The verification may be helpful in eliminating false detections of the red eyes in images. The intensity of computed second red eye region may be compared with the neighboring regions thereof (as is done in the first pass) using the smallest bounding rectangle technique using $d1(x,y)$ image (explained in conjunction with FIGS. 4 and 5). Using the smallest bounding rectangle technique, a verification of the red eye may be made in the computed second red eye region. Further, a verification of a shape of the computed red eye may be performed as discussed in FIG. 5.

At 212, the red eye regions verified for the presence of red eye may be considered for correction of the eye color defect. A correction of the detected eye color defect may be performed at 212. In an embodiment, the eye color defect may be corrected by modifying the red and green component of the red eye region pixels based on the blue component and the value of the first difference image $d1(x,y)$.

In an embodiment, an absence of the eye color defect at the computed first eye color defect region may be determined at 208 based on the one or more verifications (performed at 206) prior to computing the second difference image at 210. In an embodiment, the one or more verifications performed at 206 may include performing the verification based on a shape of the first eye color defect region upon verifying presence of the eye color defect at the computed first eye color defect region. Accordingly, based on said determination, the determined first eye color defect region may be nullified at 214. Moreover, the first eye color defect region may be re-determined at 216. In an embodiment, the first eye color region may be re-determined by re-computing the first central point, and thereafter generating a connected region based on the region growing technique as explained in FIG. 3.

The re-determined first eye color defect region may be verified for the presence of the eye color defect at 218. Upon verification, if the eye color defect is determined to be absent at the re-determined first eye color defect region, a second pass may be performed at 210. As explained, a second difference image may be computed based on a difference of red pixel intensity and green pixel intensity of a second set of pixels and an intensity level of the second set of pixels. The second set of pixels may be associated with a second eye region. Further, a neighborhood processed second difference image may be computed by processing the second difference image. Also, a second central point of the neighborhood processed second difference image may be computed based on a weighted centroid of red pixels associated with the neighborhood processed second difference image. The second eye color defect region may also be computed based on the second central point, and the red pixels associated with the second difference image. Thereafter, one or more verifications may be performed for verifying the presence of the eye color defect at the computed second eye color defect region. However, if at 208, if the eye color defect is determined to be present at 218, then correction of the detected eye color defect may be performed at 212.

Figure 3:
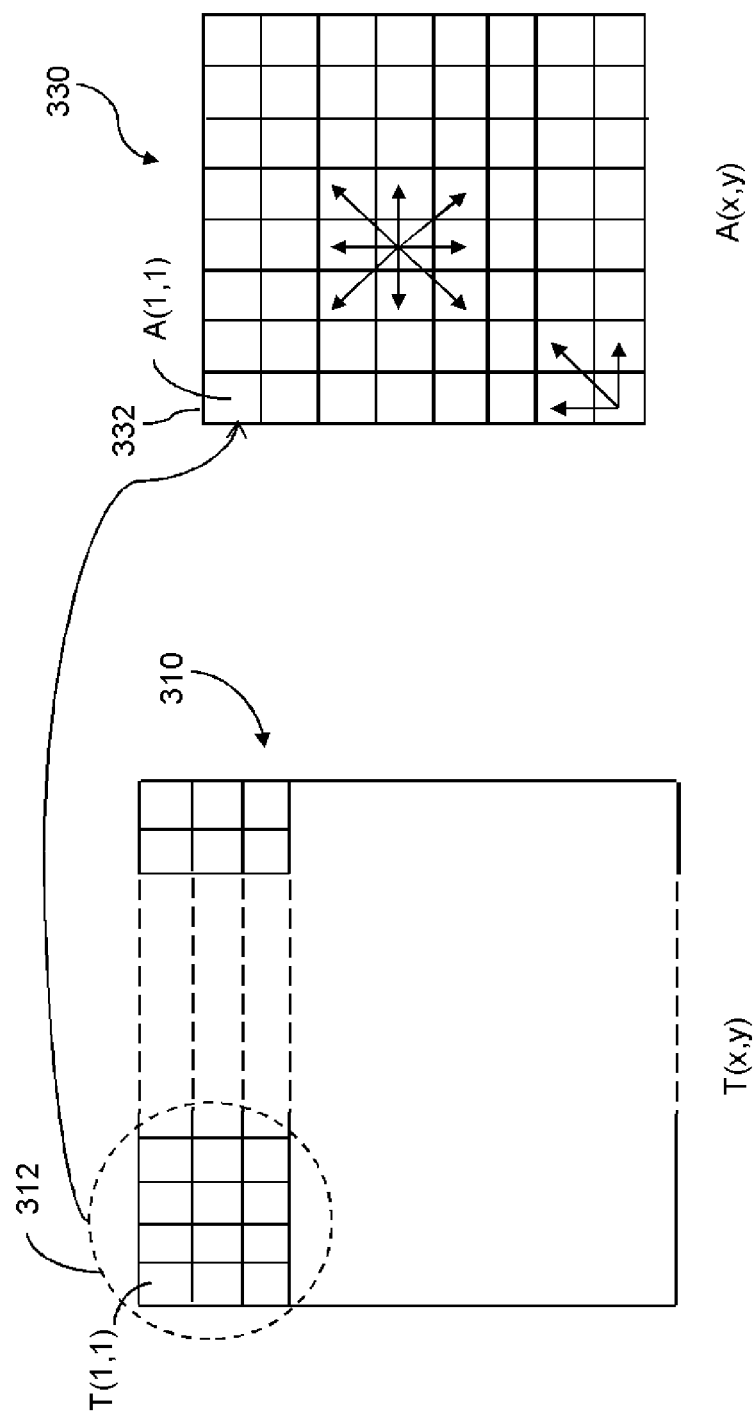
FIG. 3 is a schematic diagram illustrating processing of a difference image, in accordance with an embodiment.

FIG. 3 is a schematic diagram illustrating neighborhood processing of the first difference image $d1(x,y)$, in accordance with an embodiment. In an embodiment, the processing of the M×N regions of a temporary image, for example, a temporary image T(x,y) 310 may be assumed to be performed by replicating the temporary image T(x,y) 310 on to an average image, for example, an average image A(x,y) 330, such that every pixel in the A(x,y) 330 may correspond to a region in the T(x,y) 310. Intensity of every pixel in the A(x,y) 330, for example a pixel A(1,1) (represented as 322) may be a sum of intensities of all the pixels in the corresponding region of the T(x,y) 310, for example, the region 312.

For performing processing, the average pixel intensity of every pixel of the A(x,y) (corresponding to a region of the T(x,y)) may be compared with an average pixel intensity of a first predetermined threshold number of neighboring regions of the region. In an embodiment, the first predetermined threshold number is eight. If the average intensity of at least the first predetermined threshold neighboring regions is determined to be less than a first predetermined fraction of the average intensity of the region, a null value may be assigned to said region. In an embodiment, the fraction may be about 0.5. For example, if average intensities of the eight neighboring pixels of the current pixel lie within about 50% of the current pixel intensity, then the region corresponding to said pixel in T(x,y) is assigned the null value. Accordingly, the neighborhood processed first difference image may be computed such that each region of the neighborhood processed first difference image may be either a null value or may have a pixel intensity value corresponding to the intensity value of the normalized first difference image.

Upon computing the neighborhood processed first difference image, a first central point of the first eye color defect region may be computed based on a weighted centroid of the red pixels associated with the neighborhood processed first difference image. It may be understood to a person skilled in the art that the red pixels are indicative of the eye color defect. For the purpose of computation of said weighted centroid, it may be assumed that the red pixels representing the red eye may have higher weight as compared to pixels associated with skin region surrounding the eye region. This assumption may be attributed to the fact that there may be a sharp change in intensity, while moving radially outwards from the center of the eye portion in any direction In an embodiment, the weighted centroid of the red pixels may be computed based on co-ordinates of the red pixels associated with the neighborhood processed first difference image T(x,y), the first threshold intensity and the second threshold intensity. The first central point may be computed in accordance with the following expression:

$$Xc = \Sigma\{j*x(i,j)^K\}/\Sigma x(i,j)^K; \text{ and}$$

$$Yc = \Sigma\{i*x(i,j)^K\}/\Sigma x(i,j)^K$$

where (i,j) are coordinates of the neighborhood processed first difference image, and the summation is over all i and j, and k is a constant.
and where, x(i,j)=T(x,y), if T(x,y) is greater than or equal to the first threshold intensity (h_thr);
else x(i,j)=0.

The computation of the first central point of the red eye region using the above expression is based on the fact that the pixel intensity of the red pixels is greatest at the center of the red eye region. Accordingly, the computed first central point of the red eye region may be represented by P1_1={Xc1, Yc1}. In an embodiment, the value of k may be 6.

Upon determining the first central point P1_1 (Xc1,Yc1), a first eye color defect region may be computed based on the first central point and the red pixels associated with the first difference image. The first eye color defect region may be computed by using the region growing technique. For example, in one particular region growing technique, those pixels of the first difference image $d1(x,y)$ may be considered that may have red pixel intensity greater than the second threshold intensity (l_thr). Such pixels may be connected to the first central point P1_1 (Xc1,Yc1) of the red eye region based on eight neighborhood connectivity to generate a connected region red eye region. In an embodiment, the pixels may be connected based on eight neighborhood connectivity. However, said pixels may be connected by any other means also, such as through 4-neighborhood connectivity. The connected region, so computed may be considered as the 'instance' of the red eye region, and may be verified for the characteristics of the red eye.

Referring now to FIGS. 4 and 5, a smallest bounding rectangle (such as a bounding rectangle 402 as shown in FIG. 4) method may be explained. FIG. 4 is a schematic diagram illustrating verification of an eye color defect region in an image, and FIG. 5 is a flow chart of a method 500 for verification of an eye color defect region in an image.

The method 500 includes computing a smallest bounding rectangle for the computed red eye region enclosing the generated red eye region (such as region 404) at 502. Further, a neighborhood region of the bounding rectangle 402 may be divided into a plurality of regions, such as regions 406, 408, and the like. As illustrated in FIG. 4, the neighboring region is divided into 12 regions. However, it will be evident to a person skilled in the art that the neighboring region may be divided into more or fewer number of regions.

At 504, it may be determined whether the smallest bounding rectangle is at a border of the red eye region. If it is determined at 504 that the smallest bounding rectangle is at a border of the selected eye defect region, then a second pass may be performed to detect the presence of the red eye in the image at 506. The second pass will be explained in conjunction with FIG. 6. If it is determined at 504 that the smallest bounding rectangle is not at the border of the red eye region, then an average pixel intensity of each of the neighbouring regions of the smallest bounding rectangle is computed at 508.

Also, a number (Nr1) of neighbourhood regions having average pixel intensity lesser than a second predetermined fraction of the average pixel intensity of the enclosed first eye color defect region is computed at 510, and subsequently Nr1 is compared with a second predetermined threshold number of neighbourhood regions at 512. In one form, the second predetermined fraction may be equal to 0.5. If it is determined at 512, that the value of Nr1 is greater than the second predetermined threshold number of neighbourhood regions, then a presence of the eye color defect at the computed first eye color defect region may be determined, and thereafter a subsequent verification of the computed first eye color region is performed at 514. For example, for a smallest bounding rectangle having 12 neighborhood regions, the second predetermined threshold number of neighborhood regions may be about 7 to 9 neighborhood regions.

In an embodiment, during the subsequent verification, the computed red eye region may be verified for its shape at 514. In an embodiment, the shape of the grown region may be verified based on an aspect ratio thereof and a number of non red eye pixels (pixels other than that contained in the grown region) in the smallest bounding rectangle. In the smallest bounding rectangle, the number of pixels outside the grown red eye region is computed. Moreover, the percentage of area occupied by the non red eye pixels is computed. Additionally, aspect ratio, for example, a ratio of two adjacent sides of the smallest bounding rectangle is computed. If the value of non red eye pixels is less than a predetermined fraction of the area of the smallest bounding rectangle and the computed aspect ratio lies within a predetermined range, the computed red eye region is declared to be a red eye candidate. In one implementation, the predetermined fraction may be 0.4, and the predetermined range for aspect ratio may be aspect ratio may be about 0.7 to 1.3.

For example, A1<abs (width/height)<A2, where width and height refer to the dimensions of the rectangle (A1=0.7, A2=1.3).

If at 512, it is determined that Nr1 is less than the second predetermined threshold number of neighbourhood regions, the computed red eye region is disqualified to be a red eye and the red eye region may be re-computed at 516. In an embodiment, the re-computation of the red eye region may be performed by clearing the computed region in the neighborhood of the processed image T(x,y). Specifically, the grown region may be cleared and filled with zeroes to generate a new T(x,y). Also, a central point (also referred to as second central point P2_1) of the selected region may be computed using the new T(x,y). The second central point of the red eye region may be P2_1(Xc2,Yc2). Considering the second central point as the seed point, a second red eye region may be computed using region growing technique, and verified for the presence of the red eye. The verification may be performed based on the smallest bounding rectangle technique using the new grown region. The region growing technique and the smallest bounding rectangle technique is described in FIG. 3.

In performing the smallest bounding rectangle technique on the second red eye region, if it is determined that the number (Nr2) of neighborhood regions surrounding the new red eye region having pixel intensity less than a fraction of the average pixel intensity of the red eye area lesser than a predetermined threshold, the corresponding second generated region may be discarded as the red eye candidate and a method such as the second pass may be performed. In an embodiment, the fraction may be 0.5. However, if it is determined that Nr2 is greater than the predetermined threshold; a subsequent verification of the computed new red eye region may be performed for a shape thereof. The verification for the shape may be performed in a similar manner as explained above with reference to 514. The red eye regions verified for the presence of red eye may be considered for correction of the eye color defect. In an embodiment, the eye color defect may be corrected by modifying the red and green components of the red eye region pixels based on the blue component and the value of the first difference image $d1(x,y)$.

Figure 6:
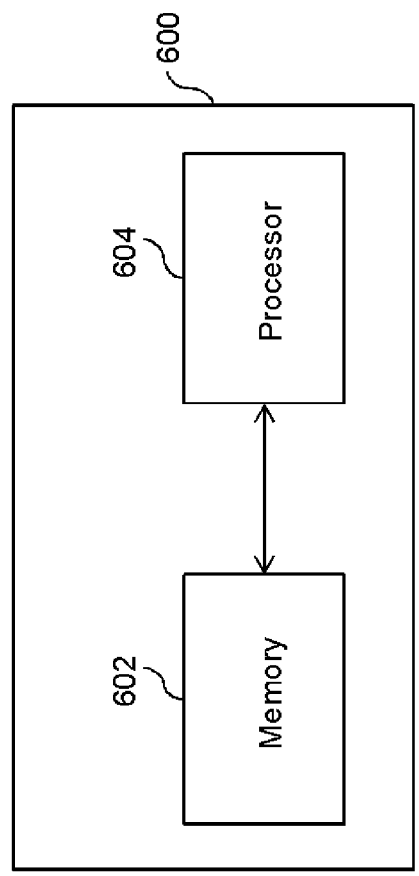
FIG. 6 illustrates a block diagram of an apparatus, in accordance with an embodiment.

FIG. 6 is a block diagram of an apparatus, such as an apparatus 600 for compensation eye color defects in digital images, in accordance with an embodiment. The apparatus 600 may include at least one memory, for example, a memory 602 and at least one processor, for example, as a processor 604. It will be apparent to a person skilled in the art that the apparatus 600 may include more than one memory and more than one processor. The memory 602 may be configured to store computer program code, and data pertaining to the digital image such as the data computed during the first pass and the second pass respectively. Such data may include, but is not limited to, the values of various thresholds, intensity values of pixels such as red pixels and green pixels, captured images and the like. The memory 602 may be a volatile memory or a non volatile memory. Examples of the one or more memory 602 include, but are not limited to, a hard drive, a Read Only Memory (ROM), a Random Access Memory (RAM), Erasable Programmable Read-Only Memory (EPROM), Electrically Erasable Programmable Read-Only Memory (EEPROM), Programmable Read-Only Memory (PROM), CD-ROM, or flash memory. The memory 602 may be permanently contained within the apparatus 600. Further, example of the at least one processor may include, but are not limited to, one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s).

The memory 602 and the computer program code can be configured, with the processor 604 to cause the apparatus 600 to perform a first pass on each of a first set of pixels associated with a first eye region. The memory 602 and the computer program code configured with the processor 604 to compute a first difference image in the first eye region. In an embodiment, the first difference image may be based on a difference of red pixels intensity and green pixel intensity of the first set of pixels associated with the first eye region. As explained in FIG. 2, the first difference image may be computed using the expression:

$$d(x,y)=[r(x,y)-g(x,y)]^2 \text{ if } r(x,y)>g(x,y),$$

else $d(x,y)=0$
where $r(x,y)$ is the red pixel intensity at location $(x,y)$ in the image, and $g(x,y)$ denotes the green pixel intensity at $(x,y)$.

Further, the memory 602 and the computer program code can be configured, with the processor 604 to cause the apparatus 600 to determine the first eye color defect region by computing a neighborhood processed first difference image by processing the first difference image. In an embodiment, the memory 602 and the computer program code can be configured, with the processor 604 to cause the apparatus 600 to compute the neighborhood processed first difference image by first copying the first difference image area $d1(x,y)$ into a temporary image $T(x,y)$, and thereafter dividing the temporary image $T(x,y)$ into a plurality of M×N non-overlapping regions, each having an average intensity. Also, the memory 602 and the computer program code can be configured, with the processor 604 to cause the apparatus 600 to compare the average pixel intensity of every pixel of $A(x,y)$ (corresponding to a region of $T(x,y)$) with an average pixel intensity of the first predetermined threshold number of neighboring regions of the region, and assigning a null value to said region if the average intensity of at least one of the first predetermined threshold neighboring regions is determined to be less than a first predetermined fraction of the average intensity of the region. In an embodiment, the fraction may be about 0.5. As explained with reference to the method flowchart, the neighborhood processed first difference image may be computed such that each region of the neighborhood processed first difference image may be either a null value or may have a pixel intensity value corresponding to the intensity value of the normalized first difference image.

The memory 602 and the computer program code can be configured, with the processor 604 to cause the apparatus 600 to compute the first central point of the first eye color defect region based on a weighted centroid of red pixels associated with the neighborhood processed first difference image. In an embodiment, the weighted centroid of the red pixels is calculated based on co-ordinates of red pixels associated with the neighborhood processed first difference image, a first threshold intensity and a second threshold intensity. The memory 602 and the computer program code can be configured, with the processor 604 to cause the apparatus 600 to compute the first central point of the first eye color defect region based on the following equations:

$$Xc=\Sigma\{j*x(i,j)^K\}/\Sigma x(i,j)^K, \text{ and}$$

$$Yc=\Sigma\{i*x(i,j)^K\}/\Sigma x(i,j)^K$$

where $(i,j)$ are coordinates of the neighborhood processed first difference image, and the summation is over all i and j, and k is a constant.
and where, $x(i,j)=T(x,y)$, if $T(x,y)$ is greater than or equal to the first threshold intensity (h_thr);
else $x(i,j)=0$.

The memory 602 and the computer program code can be configured with the processor 604 to cause the apparatus 600 compute the first eye color defect region based on the computed first central point, and the red pixels associated with the first difference image. In an embodiment, the first eye color defect region may be computed by using the region growing technique known in the art.

Further, the memory 602 and the computer program code can be configured, with the processor 604 to cause the apparatus 600 at least to perform one or more verifications of the presence of an eye color defect at the computed first eye color defect region. In an embodiment, the memory 602 and the computer program code can be configured to, with the processor 604, to cause the apparatus 600 at least to perform the one or more verifications of the presence of the eye color defect at the computed first eye color defect region by computing a smallest bounding rectangle for enclosing the eye color defect region, and dividing a neighborhood region of the bounding rectangle into a plurality of regions such that each of the plurality of regions may have an average pixel intensity. An example of the smallest bounding rectangle technique is explained with reference to FIG. 4.

In an embodiment, the memory 602 and the computer program code can be configured, with the processor 604 to cause the apparatus 600 at least to perform the one or more verifications by performing a subsequent verification based on a shape of the first eye color defect region. In an embodiment, the shape of the generated region may be verified based on an aspect ratio thereof and a number of non red eye pixels in the smallest bounding rectangle. As explained with reference to FIG. 4, in the bounding rectangle, the memory 602 and the computer program code can be configured, with the processor 604 to cause the apparatus 600 at least to compute the number of non red eye pixels, the percentage of area occupied by the non red eye pixels and the aspect ratio of the bounding rectangle. If the value of non red eye pixels is less than a predetermined fraction of the area of the bounding rectangle, and if the computed aspect ratio lies within a predetermined range, then the computed red eye region is declared to be a red eye candidate. In one implementation, the predetermined fraction may be 0.4, and the predetermined range for aspect ratio may be about 0.7 to 1.3.

For example, A1<abs(width/height)<A2, where width and height refer to the dimensions of the rectangle (A1=0.7, A2=1.3).

The memory 602 and the computer program code can be configured with the processor 604 to cause the apparatus 600 at least to re-compute the eye color defect region upon determining the number of neighborhood regions having an average pixel intensity less than the predetermined fraction of the average intensity of the eye color defect region less than the second predetermined threshold number of neighbourhood regions. The method of re-computation is explained with reference to the flow chart of FIG. 2.

Further, the memory 602 and the computer program code can be configured, with the processor 604 to cause the apparatus 600 at least to compute an average pixel intensity of the computed first eye color defect region. Thereafter, the memory 602 and the computer program code can be configured, with the processor 604 to cause the apparatus 600 at least to perform a verification of the presence of eye color defect at the computed eye color defect region upon determining a predetermined threshold number of neighborhood regions having an average pixel intensity lesser than a predetermined fraction of the average intensity of the eye color defect region. In an embodiment, the predetermined fraction is about 0.5.

In an embodiment, the memory 602 and the computer program code can be configured, with the processor 604 to cause the apparatus 600 at least to verify the absence of the eye color defect, and re-compute the first difference image that may be further processed. Prior to computing the second difference image, the at least one memory and the computer program code can be configured to, with the at least one processor, cause the apparatus 600 at least to determine an absence of the eye color defect at the computed first eye color defect region based on the one or more verifications. Accordingly, the memory 602 and the computer program code can be configured, with the processor 604 to cause the apparatus 600 at least to nullify the determined first eye color defect region. Moreover, the memory 602 and the computer program code can be configured, with the processor 604 to cause the apparatus 600 at least to re-determine the first eye color region. The re-determination of the first eye color defect region is explained with reference to FIG. 2.

Further, the memory 602 and the computer program code can be configured, with the processor 604 to cause the apparatus 600 at least verify presence of the eye color defect at the re-determined first eye color defect region. In an embodiment, the memory 602 and the computer program code can be configured, with the processor 604 to cause the apparatus 600 at least verify presence of the eye color defect based on the shape of the re-determined first eye color defect region. Upon determining the absence of the eye color defect at the re-determined first eye color defect region, the memory 602 and the computer program code can be configured, with the processor 604 to cause the apparatus 600 to perform a subsequent pass, such as a second pass.

In an embodiment, the at least one memory 602 and the computer program code configured to, with the at least one processor 604, cause the apparatus 600 at least to correct the eye color defect at the re-determined first eye color defect region.

In an embodiment, the memory 602 and the computer program code can be configured, with the processor 604 to cause the apparatus 600 at least to compute a second difference image upon verification of a partial presence of the eye color defect at the computed first eye color defect region. Each of the second set of pixels is associated with a second eye region. The second eye region may be obtained by expanding boundaries of the first eye region.

The second difference image may be computed based on a difference of red pixel intensity and green pixel intensity of the second set of pixels, and an intensity level of the second set of pixels. As described with reference to FIG. 2, the second difference image d2($x,y$) may be computed as:

$$d2(x,y)=p(r(x,y))*\{(r(x,y)-g(x,y))/r(x,y)\}^2 \text{ if } r(x,y)>g(x,y),$$

else d2($x,y$)=0 for the second eye region.

In an embodiment, the value of p(i) for different intensities may vary as:

p(i)=0; if i<40;
p(i)=1; if (i>=60);
p(i)=(i−40)/20; if (40<=i<60).

The memory 602 and the computer program code can be configured, with the processor 604 to cause the apparatus 600 at least to compute a neighborhood processed second difference image by processing the second difference image and the first difference image. In an embodiment, the memory 602 and the computer program code can be configured, with the processor 604 to cause the apparatus 600 at least to process the second difference image for computing the second eye color defect region in the second eye region. The second difference image may be processed by computing a second central point of the neighborhood processed second difference image based on a weighted centroid of red pixels associated with the neighborhood processed second difference image, and thereafter computing the second eye color defect region based on the computed second central point, and the red pixels associated with the second difference image.

The memory 602 and the computer program code can be configured, with the processor 604 to cause the apparatus 600 at least to perform one or more verifications of the presence of an eye color defect at the computed second eye color defect region. In an embodiment, said verification may be performed based on the smallest bounding rectangle technique (explained in FIGS. 4 and 5). Further, the memory 602 and the computer program code can be configured, with the processor 604 to cause the apparatus 600 at least to correct the eye color defect upon verifying the presence of the eye color defect in at least one of the first pass and the second pass.

Figure 7:
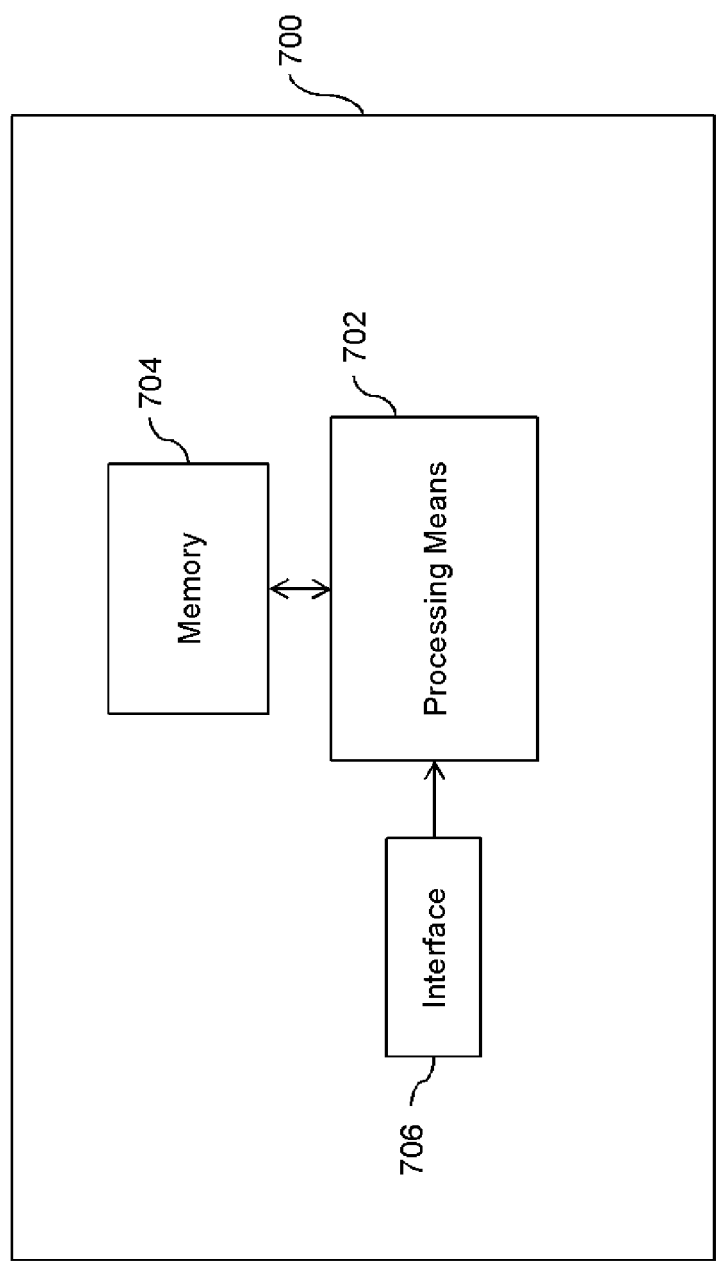
FIG. 7 illustrates a block diagram of an apparatus, in accordance with another embodiment.

Reference now to FIG. 7, an apparatus 700 for compensating eye color defects in digital images is illustrated in accordance with another embodiment. The apparatus 700 may be a camera or any other image capturing and/or apparatus capable of processing images, thereby facilitating compensation of eye color defects in digital images. The apparatus 700 may include various means for performing at least one function in accordance with various embodiments, including those shown and described herein. It should be understood that the apparatus 700 may include alternative means for performing at least one like functions, without departing from the spirit and scope of the present disclosure.

An entity capable of operating as apparatus (for example, the apparatus 600) may include means, such as a processing means 702 connected to a memory 704, for performing or controlling various functions of the entity. The processing means 702 may be an apparatus, a processor, a controller or the like. The processing means 702 may be means for performing a first pass on the first set of pixels in the first eye region, and optionally one or more subsequent passes on the second set of pixels in the second pass. The first pass may be performed by computing a first difference image in the first eye region based on a difference of red pixels intensity and green pixel intensity of the first set of pixels, and determining a first eye color defect region.

The determination of the first eye color defect region may be performed by computing a neighborhood processed first difference image by processing the first difference image. Further, the processing means 702 may be configured to compute a first central point of the neighborhood processed first difference image based on a weighted centroid of red pixels associated with the neighborhood processed first difference image. Furthermore, the processing means 702 may be configured to compute the first eye color defect region based on the first central point, and the red pixels associated with the first difference image. Additionally, the processing means 702 may perform one or more verifications of the presence of an eye color defect at the computed first eye color defect region. The memory 704 may include volatile and/or non-volatile memory and typically stores various data pertaining to the compensation of eye color defects in images in the apparatus 700.

In addition to the memory 704, the processing means 702 may also be connected to at least one interface (such as an interface 706) or other means for displaying, and interacting with the apparatus 700 for compensating eye color defects in images. The interface may include at least one interface for enabling interaction of a user with the apparatus 700. Such an interface may include a display and/or a user input interface. The user interface 706 may include any number of apparatus allowing the entity to receive input from a user by means of a keyboard, a touch display, or any other input peripheral device.

Some functionalities of said means for compensation eye color defects images are described in conjunction with the flowchart of the method 200.

Further, it should be understood that said means for compensating the eye color defects in images may be implemented in a hardware solution using electronic circuitries or neural network based devices, or even though as computer software code.

Furthermore, the present disclosure may take the form of a computer program product for compensating eye color defects in a digital image, on a computer-readable storage medium having computer-readable program instructions (e.g., computer software) embodied in the computer-readable storage medium. Any suitable computer-readable storage medium (hereinafter 'storage medium') may be utilized including hard disks, CD-ROMs, RAMs, ROMs, Flash memories, optical storage devices, or magnetic storage devices.

The present disclosure is described above with reference to block diagrams and flowchart illustrations of methods and apparatus embodying the present disclosure. It will be understood that functionalities of various blocks of the block diagram and flowchart illustrations, and combinations of functionalities of various blocks of the block diagrams and the flowchart illustrations, respectively, may be implemented by a set of computer program instructions. These set of instructions may be loaded onto a general purpose computer, special purpose computer, or other programmable data processing apparatus to produce a machine, such that the set of instructions when executed on the computer or other programmable data processing apparatus create a means for implementing the functions specified in the flowchart block or blocks. Although other means for implementing the functions including various combinations of hardware, firmware and software as described herein may also be employed.

These computer program instructions may also be stored in a computer-readable medium that can direct a computer or other programmable data processing apparatus to function in a particular manner, such that the instructions stored in the computer-readable memory produce an article of manufacture including computer-readable instructions for implementing the function specified in the flowchart of the methods 200 or 500. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing functions/methods specified in the flowchart of the methods 200 and/or 500.

Based on the foregoing, methods, computer program products and apparatus are provided for compensation of eye color defect in digital images by processing the image in multiple passes, such as a fist pass and a second pass. During each pass, a selected eye region may be verified one or more times for the presence of eye color defects, such as red eyes, golden eyes and the like, thereby facilitating detection and correction of eye color defects of varying brightness and intensities. Further, due to the second pass (which is based on varying intensity levels), the detection rate of the eye color defects is high. Moreover, during the second pass, the eye regions at the boundaries may also be processed for determination of any eye color defect, and accordingly, eye color defects missed in the first pass may be detected in the second pass with a high probability. In an embodiment, a method of computation of a central point of the red eye defect region is provided for enhancing an accuracy of computation of the potential red eye region.

Those skilled in that art would appreciate that the processing time in detecting the eye color defects of varying intensities and saturation levels may be different. For example, for detecting a bright/high saturated eye color defect image may require very less time since such a defect may be detected in the first pass. For a less saturated, dark red eye color, the defect may be detected in the second pass. Also, for an eye region having partial redeye (partial red eye is outside the eye region), the red eye may be detected in the second pass, and accordingly may take a slightly longer time.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A method comprising:
   computing using a processor a smallest bounding rectangle for enclosing a first eye color defect region;
   dividing a neighborhood region of the smallest bounding rectangle into a plurality of regions having an average pixel intensity;

computing an average pixel intensity of the enclosed first eye color defect region, and a number of neighborhood regions having average pixel intensity lesser than a second predetermined fraction of the average pixel intensity of the enclosed first eye color defect region; and determining presence of an eye color defect at the computed first eye color defect region upon determining the number of neighborhood regions having an average pixel intensity less than the second predetermined fraction of the average pixel intensity of the enclosed first eye color defect region being greater than a second predetermined threshold.

2. The method of claim 1 further comprising:
computing a first difference image for a first eye region based on a difference of red pixel intensity and a green pixel intensity of each of a first set of pixels associated with the first eye region; and
determining the first eye color defect region based on the computing.

3. The method of claim 2 further comprising:
computing a second difference image based on:
difference of a red pixel intensity and a green pixel intensity of a second set of pixels, and
an intensity level of the second set of pixels associated with a second eye region;
determining a second eye color defect region, if the first eye region fails in the verification; and
correcting the eye color defect at the computed second eye color defect region.

4. The method of claims 1, further comprising performing a verification based on a shape of the first eye color defect region upon verifying presence of the eye color defect at the computed first eye color defect region.

5. The method of claim 1 further comprising correcting the eye color defect at the determined first eye color defect region upon verifying presence of the eye color defect at the determined first eye color defect region.

6. An apparatus comprising:
at least one processor; and
at least one memory comprising data associated with an image and computer program code, the at least one memory and the computer program code configured to, with the at least one processor, cause the apparatus at least to:
compute a smallest bounding rectangle for enclosing a first eye color defect region;
divide a neighborhood region of the smallest bounding rectangle into a plurality of regions having an average pixel intensity;
compute an average pixel intensity of the enclosed first eye color defect region, and a number of neighborhood regions having average pixel intensity lesser than a second predetermined fraction of the average pixel intensity of the enclosed first eye color defect region; and
determine presence of an eye color defect at the computed first eye color defect region upon determining the number of neighborhood regions having an average pixel intensity less than the second predetermined fraction of the average pixel intensity of the enclosed first eye color defect region being greater than a second predetermined threshold.

7. The apparatus of claim 6, wherein the at least one memory and the computer program code configured to, with the at least one processor, cause the apparatus at least to:

compute a first difference image for a first eye region based on difference of a red pixel intensity and a green pixel intensity of each of a first set of pixels associated with the first eye region; and
determine the first eye color defect region based on the computing.

8. The apparatus of claim 7, wherein the at least one memory and the computer program code configured to, with the at least one processor, cause the apparatus at least to:
compute a second difference image based on:
a difference of red pixel intensity and green pixel intensity of a second set of pixels, and
an intensity level of the second set of pixels, the second set of pixels associated with a second eye region;
determine a second eye color defect region, if the first eye region fails in the verification; and
correct the eye color defect at the computed second eye color defect region.

9. The apparatus of claim 6, wherein the at least one memory and the computer program code configured to, with the at least one processor, cause the apparatus at least to:
perform a verification based on a shape of the first eye color defect region upon verifying presence of the eye color defect at the computed first eye color defect region.

10. The apparatus of claim 6, wherein the at least one memory and the computer program code configured to, with the at least one processor, cause the apparatus at least to:
correct the eye color defect at the determined first eye color defect region upon verifying presence of the eye color defect at the determined first eye color defect region.

11. A computer program product comprising at least one computer-readable storage medium, the computer-readable storage medium comprising a set of instructions configured to cause an apparatus to at least:
compute a smallest bounding rectangle for enclosing a first eye color defect region;
divide a neighborhood region of the smallest bounding rectangle into a plurality of regions having an average pixel intensity;
compute an average pixel intensity of the enclosed first eye color defect region, and a number of neighborhood regions having average pixel intensity lesser than a second predetermined fraction of the average pixel intensity of the enclosed first eye color defect region; and
determine presence of an eye color defect at the computed first eye color defect region upon determining the number of neighborhood regions having an average pixel intensity less than the second predetermined fraction of the average pixel intensity of the enclosed first eye color defect region being greater than a second predetermined threshold.

12. The computer program product of claim 11, wherein the set of instructions are further configured to cause the apparatus at least to perform:
compute a first difference image for a first eye region based on difference of a red pixel intensity and a green pixel intensity of each of a first set of pixels associated with the first eye region; and
determine the first eye color defect region based on the computing.

13. The computer program product of claim 12, wherein the set of instructions are further configured to cause the apparatus at least to perform:
compute a second difference image based on:
a difference of red pixel intensity and a green pixel intensity of a second set of pixels, and an intensity level of the second set of pixels associated with a second eye region;
determine a second eye color defect region, if the first eye region fails in the verification; and
correct the eye color defect at the computed second eye color defect region.

14. The computer program product of claim 11, wherein the set of instructions are further configured to cause the apparatus at least to perform:
perform a verification based on a shape of the first eye color defect region upon verifying presence of the eye color defect at the computed first eye color defect region.

15. The computer program product of claim 11, wherein the set of instructions are further configured to cause the apparatus at least to perform:
correct the eye color defect at the determined first eye color defect region upon verifying presence of the eye color defect at the determined first eye color defect region.

* * * * *